No. 780,046. PATENTED JAN. 17, 1905.
B. G. LAMME.
ARMATURE WINDING FOR ELECTRIC MOTORS.
APPLICATION FILED MAY 3, 1904.

WITNESSES:
Fred. H. Miller
Otto S. Schairer

INVENTOR
Benjamin G. Lamme
BY
Kerby G. Carr
ATTORNEY

No. 780,046.

Patented January 17, 1905.

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

ARMATURE-WINDING FOR ELECTRIC MOTORS.

SPECIFICATION forming part of Letters Patent No. 780,046, dated January 17, 1905.

Application filed May 3, 1904. Serial No. 206,185.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Armature-Windings for Electric Motors, of which the following is a specification.

My invention relates to electric motors, and particularly to means for reducing the sparking between the commutator-bars and brushes of motors when operated by means of alternating currents.

My invention has for its object to provide a means for the purpose described which shall be of such character and proportions that the heating thereof may be reduced to a minimum.

In the accompanying drawings the two figures represent diagrammatically portions of the armature-winding and commutator-cylinder and the conditions of the circuits therein as they occur in an electric motor constructed in accordance with my invention.

It has heretofore been proposed to connect the armature-windings of electric motors to the commutator-bars by means of relatively high resistance-leads for the purpose of reducing the sparking between the commutator-cylinder and the brushes; and it is the object of my invention to so proportion these resistance-leads that the heating thereof is reduced to a minimum.

Figure 1:
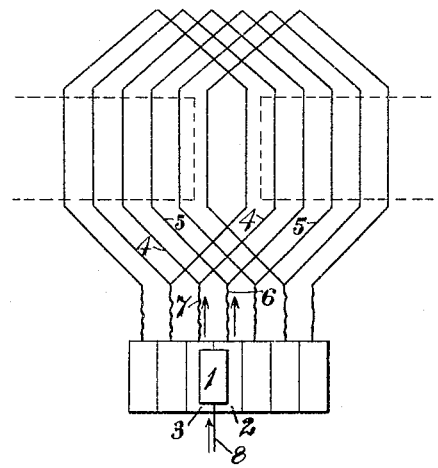

At a given instant brush 1 bears upon commutator-bars 2 and 3, which are respectively connected with coils 4 and 5 of the armature-winding by means of suitable high-resistance leads 6 and 7. The currents flowing in the said coils may be subdivided into two elements, the first of which is the working current, or that supplied from an external circuit to the armature-winding through the lead 8 and the brush 1. If the brush 1 bears upon the two commutator-bars 2 and 3, the current supplied to said brush divides, one portion flowing through the lead 6 and coil 5 and the other portion through the lead 7 and coil 4, as shown in Fig. 1. The amount of this element of the current depends upon the conditions of operation of the motor.

Figure 2:
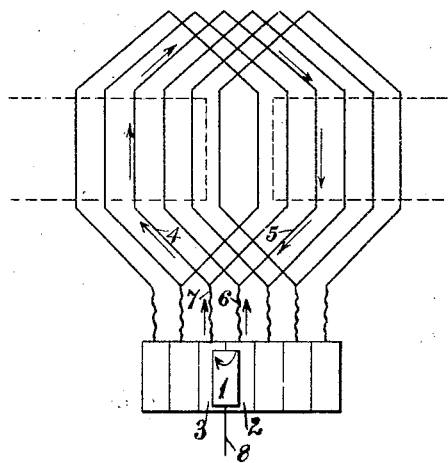

The second element of the current in the armature-coils is that induced in the portions of the armature-winding which are short-circuited by the brush 1 when bearing upon two commutator-bars, the field of the motor forming the primary winding of the transformer, of which the short-circuited armature-coils form the secondary winding. These conditions are illustrated in Fig. 2 and correspond to what the conditions of the circuits would be if no current were supplied from an external source to the armature-winding, just as the conditions shown in Fig. 1 may be attained by supplying current to the armature-winding from an external source without energizing the field-magnet winding.

The amount of induced currents in the armature-winding depends upon the electromotive force set up in them by the field magnetization and upon the amount of resistance in the closed circuit introduced by the coils, leads to the commutator, and the brushes. It is evident that these two elements of the current in the armature-winding combine in leads 6 and 7, and the resistance loss in the leads will be due to the resultant of these elements.

I have found that for a minimum loss in the leads under given conditions the current in the leads which is induced by the action of the alternating field upon the short-circuited portions of the armature-winding should be approximately equal to the current in the leads which is supplied from the external source for operation of the motor—that is, the induced current should equal the working current of the motor. As the current supplied to the brush 1 normally divides into two paths, respectively, through the leads 6 and 7, as shown in Fig. 1, the local current or induced current due to the alternating field should be equal to one-half the value of the working current which is supplied to the brush in order that the two currents or the two elements of the current in the leads may become of practically equal value. It is evident, then, that the best value for the resistance of the leads 6 and 7 is such that the secondary current induced in the short-circuited portions of the armature-winding may be limited to one-half the value of the total current supplied to the armature from an external source in order to obtain a minimum loss in the leads for any given condition of operation of the motor—that is, the currents in the leads 6 and 7 which are induced in the coils 4 and 5 should be approximately equal to the working currents passing through these leads.

If a greater resistance than the predetermined best value were used, the induced or secondary current would be diminished and its loss would be correspondingly diminished, while the loss due to the working current would be increased as the resistance is increased, and the combined losses would be slightly greater than would be obtained for the condition of equal elements of the current. Conversely, if the resistance of the leads is less than the predetermined best value the loss due to the working current is decreased, while the loss due to the secondary current is increased, since there is an increase in the value of the secondary current because of the decrease in resistance, and the combined loss is slightly greater than that corresponding to the above-stated condition of equal currents. The increased loss in the resistance-leads is not great for a slight departure from the above-indicated best resistance; but for any wide departure therefrom the loss will be considerably increased.

The given condition of operation of the motor for which the value of the resistance in the leads between the armature-winding and the commutator-bars will normally be adjusted is that of full-load running; but it is to be understood that the resistance may be so proportioned as to make the induced currents and the working currents in the armature-winding approximately equal for any other conditions of operation. If the value of the resistance is determined for normal full-load running, then at lighter loads the conditions will be satisfactory, for at such lighter loads the field strength will be lower, and therefore the induced current will be lower and also the working current.

As usually proportioned I have found that by far the greater part of the resistance included between adjacent commutator-bars is that offered by the leads connecting the armature-winding with the commutator, and this value is generally seventy-five or eighty per cent. of the total resistance required for the best results. Therefore without considering the resistance of the brushes and the armature-winding the resistance in the leads should be such that the induced current which flows in the short-circuited portions of the armature-winding may be about twenty-five per cent. greater in value than the working current supplied to the armature-winding through the brushes. Although I have found these values to be highly satisfactory in the operation of the motor, I desire it to be understood that any other ratio of values of the two currents or the two elements of the currents may be taken which may be found to result in the minimum of loss in the resistance-leads.

I claim as my invention—

1. In an alternating-current electric motor, the combination with an armature-winding, a commutator-cylinder, and brushes bearing thereon, of leads connecting the armature-winding with the commutator-bars and having such resistance that under normal running conditions of the motor the average of the currents induced in the short-circuited portions of the armature-winding may be approximately twenty-five per cent. greater than the average of the currents supplied to said portions.

2. In an alternating-current electric motor, the combination with an armature-winding, a commutator-cylinder and brushes bearing thereon, of leads connecting the armature-winding with the commutator-bars and having such resistance that under normal running conditions of the motor the average of the currents in said leads which are induced in the armature-winding may be approximately twenty-five per cent. greater than the average of the currents therein which are supplied to the armature-winding.

3. In an alternating-current electric motor, the combination with an armature-winding, a commutator-cylinder, and brushes bearing thereon, of leads connecting the armature-winding with the commutator-bars and having such resistance that the average losses therein due to the currents induced in the armature-winding may be made approximately equal to the average losses therein due to the working currents supplied to said winding.

4. In an alternating-current electric motor, the combination with an armature-winding, a commutator-cylinder, and brushes bearing thereon, of leads connecting the armature-winding with the commutator-bars and having such resistance that the average heating thereof due to the currents induced in the armature-winding may be made approximately equal to the average heating thereof due to the working currents supplied to said winding.

5. In an alternating-current electric motor, the combination with an armature-winding, a commutator-cylinder, and brushes bearing thereon, of leads connecting the armature-winding with the commutator-bars and having such resistance that the heating thereof may be produced in approximately equal amounts respectively by the currents induced in the armature-winding and by those supplied to the said winding.

6. In an alternating-current electric motor, the combination with an armature-winding, a commutator-cylinder, and brushes bearing thereon, of leads connecting the armature-winding with the commutator-bars and having such resistance that the average heating thereof may be reduced to a minimum.

7. In an alternating-current electric motor, the combination with an armature-winding, a commutator-cylinder, and brushes bearing thereon, of leads connecting the armature-winding with the commutator-bars and having such resistance that the combined average heating thereof due to currents induced in the armature-winding and those supplied thereto may be reduced to a minimum.

8. In an alternating-current electric motor, the combination with an armature-winding, a commutator-cylinder, and brushes bearing thereon, of leads connecting the armature-winding with the commutator-bars and having such resistance that the combined average losses occurring therein due to currents induced in the armature-winding and those supplied thereto may be reduced to a minimum.

9. In an alternating-current electric motor, the combination with an armature-winding, a commutator-cylinder, and brushes bearing thereon, of leads connecting the armature-winding with the commutator-bars and having such resistance that the average current induced in the short-circuited portions of the armature-winding may be approximately equal to the average working current supplied to those portions of the winding.

In testimony whereof I have hereunto subscribed my name this 13th day of April, 1904.

BENJ. G. LAMME.

Witnesses:
   E. M. STEWART,
   BIRNEY HINES.